S. P. TAYLOR.
FERTILIZER DISTRIBUTER.
APPLICATION FILED SEPT. 27, 1919.
1,368,303.
Patented Feb. 15, 1921.
2 SHEETS—SHEET 1.
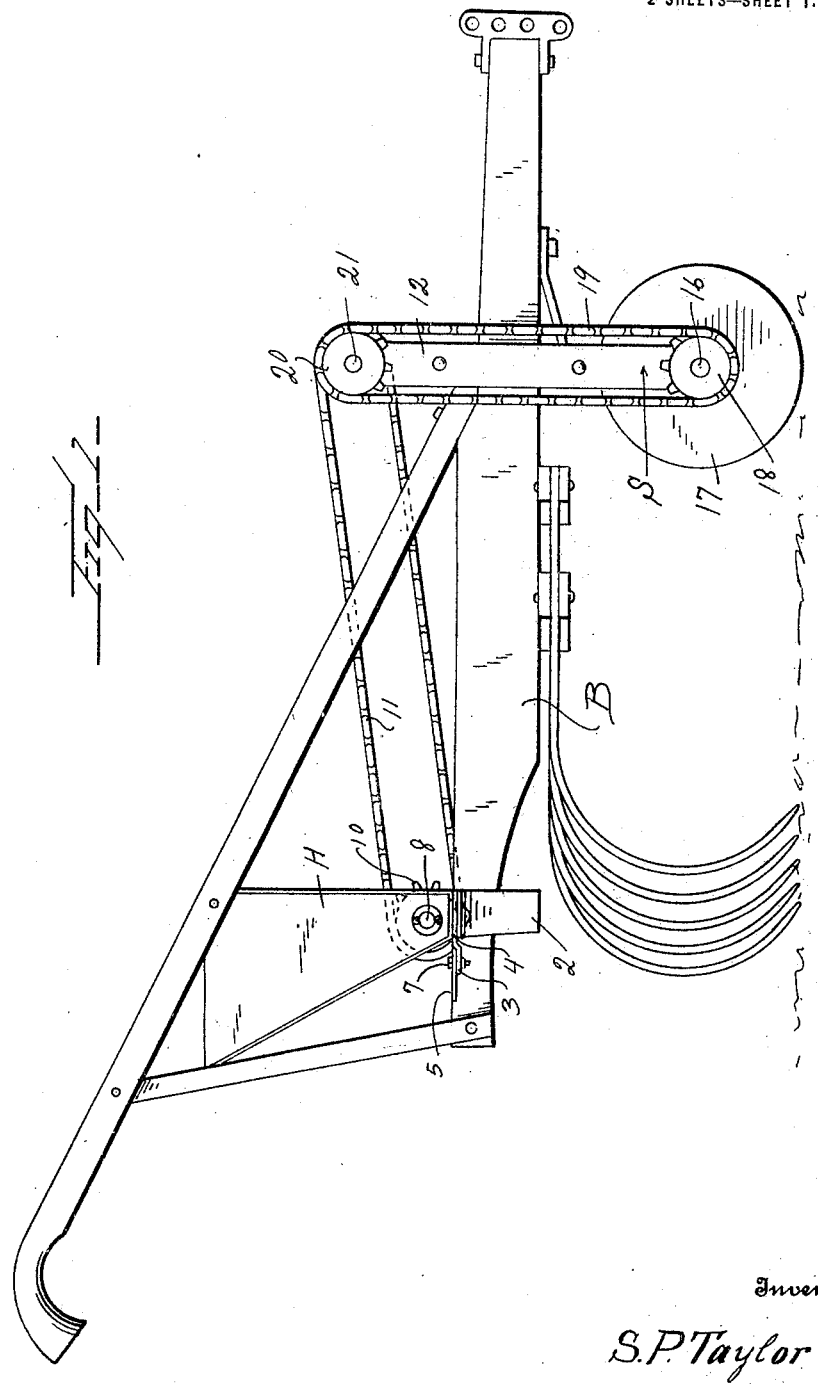
Inventor
S. P. Taylor
By Watson E. Coleman
Attorney

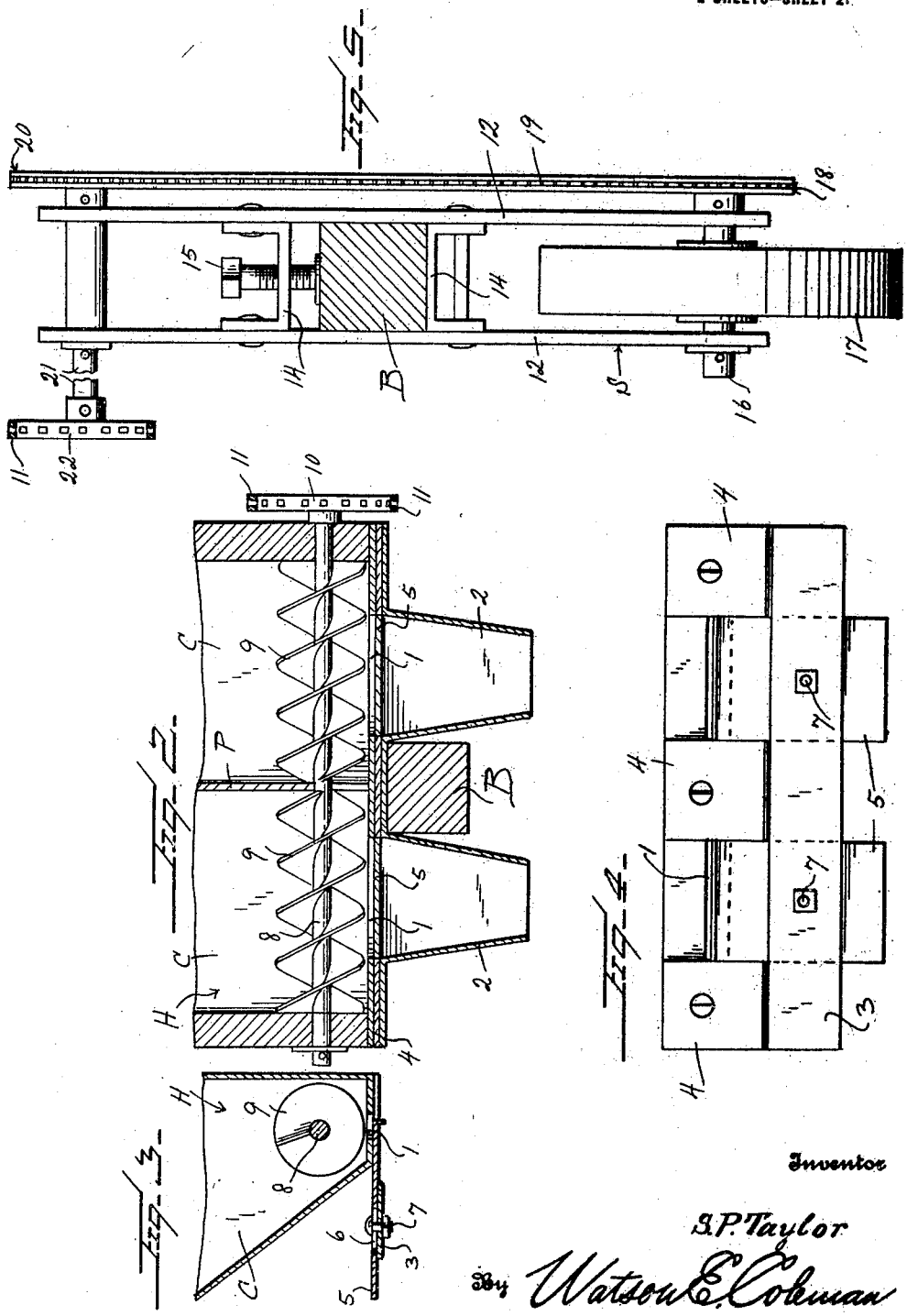

UNITED STATES PATENT OFFICE.

SILAS P. TAYLOR, OF LORETTO, TENNESSEE, ASSIGNOR, BY DIRECT AND MESNE ASSIGNMENTS, TO TENNESSEE IMPLEMENTS SALES CO., OF LORETTO, TENNESSEE, A CORPORATION OF TENNESSEE.

FERTILIZER-DISTRIBUTER.

1,368,303.      Specification of Letters Patent.    Patented Feb. 15, 1921.

Application filed September 27, 1919. Serial No. 326,721.

*To all whom it may concern:*

Be it known that I, SILAS P. TAYLOR, a citizen of the United States, residing at Loretto, in the county of Lawrence and State of Tennessee, have invented certain new and useful Improvements in Fertilizer-Distributers, of which the following is a specification, reference being had to the accompanying drawings.

This invention relates to certain improvements in fertilizer distributers, and it is an object of the invention to provide a novel and improved device of this general character which may be readily and conveniently applied to the beam of a plow or cultivator.

It is also an object of the invention to provide a novel and improved device of this general character wherein a feeding member is arranged within the hopper of the distributer, and wherein said feeding member is in driving connection with a ground engaging wheel carried by the beam of the plow or cultivator.

The invention consists in the details of construction and in the combination and arrangement of the several parts of my improved fertilizer distributer whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation illustrating a fertilizer distributer constructed in accordance with an embodiment of my invention, and in applied position;

Fig. 2 is a fragmentary vertical sectional view taken through the hopper of the distributer, as herein embodied, certain of the parts being in elevation;

Fig. 3 is a transverse sectional view taken through the structure shown in Fig. 2;

Fig. 4 is a view in bottom plan of the hopper, illustrating the valve plates for controlling the discharge from the hopper, and;

Fig. 5 is an enlarged view partly in section and partly in elevation of the driving means herein embodied, and in applied position.

As disclosed in the accompanying drawings, B denotes a beam of a cultivator, although it is to be understood that said beam may be employed in connection with breaking plows or other ground working members.

H denotes a hopper adapted to be suitably held upon the rear portion of the beam B at a point substantially above the ground working members, and said hopper is of a length to extend beyond opposite sides of the beam. The bottom portion of the hopper at adjacent opposite ends is provided with discharge openings 1, each delivering within a spout or chute 2.

3 denotes an elongated strip extending longitudinally of the hopper, and provided with a series of longitudinally spaced fingers 4 underlying the bottom of the chute and suitably secured thereto. The fingers 4 herein disclosed are three in number and the space between adjacent fingers and in proximity to the strips 3, afford a guide opening for a sliding valve plate 5 coacting with an opening 1, whereby the flow through said opening may be readily and conveniently controlled. Each of the plates of valves 5 is provided with a slot 6, extending in the direction of movement of said plate or valve 5, and extending through said slot 6 is a holding bolt or member 7, whereby the plate or valve 6 is maintained in working position and permitted to have limited sliding movement.

The hopper H is divided by a transverse partition P into two compartments C, with each of which an opening 1 communicates, although under certain conditions this partition may be omitted.

Extending longitudinally of the hopper H and supported by the end walls thereof at a point in close proximity to the bottom of the hopper and directly above the openings 1 is a rotatable shaft or feed member 8 having its portion within each of the compartments C of spiral formation, as at 9, so that upon rotation of the shaft or member 8 the spirals 9 will assure the desired feeding of the fertilizer through either or both of the openings 1.

The shaft or member 8 has secured thereto exteriorly of the hopper H a sprocket wheel 10 with which is engaged a sprocket chain 11 to afford a driving means for said member or shaft 8.

S denotes a standard or frame adapted to be engaged with the forward end portion of the beam B, as is herein embodied, said standard comprising two spaced members 12 maintained in spaced relation through the medium of the transverse members 14. The beam B extends between the members 12 and 14, and the standard S is held in working position through the instrumentality of the binding screw 15 threaded through the upper member 14. By this means the standard S may be readily applied or removed from the beam B as the occasions of practice may require.

Rotatably supported by the lower ends of the members 12 is a shaft 16, to which is affixed a ground engaging wheel 17 positioned between the members 12. The shaft 16 has an extended portion to which is affixed a sprocket wheel 18 and directed around the sprocket wheel 18 is a chain 19, which is also disposed around a second sprocket wheel 20. The sprocket wheel 20 is affixed to an end portion of a shaft 21 rotatably supported by the upper end portions of the members 12. The opposite end portion of this second shaft 21 has affixed thereto a sprocket wheel 22 around which is disposed the sprocket chain 11, hereinbefore referred to. By this means it will be readily seen that as the ground engaging wheel 17 traverses the ground the feed member or shaft 18 will be caused to rotate.

From the foregoing description, it is thought to be obvious that a fertilizer distributer constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

The combination with a beam provided with ground working implements, and a dispensing mechanism carried by one end of said beam above said implements, of a frame having an opening for the reception of said beam, a clamping screw carried by said frame for engagement with the beam, a shaft journaled in each end portion of the frame, a ground engaging wheel mounted on one of said shafts, a sprocket wheel mounted on the other end of said shaft, sprocket wheels mounted on the shaft carried by the other end of the frame, and an endless member connecting the first mentioned sprocket wheel with one of the second mentioned sprocket wheels, and an endless member connecting the other of said second mentioned sprocket wheels and the mechanism carried by the beam.

In testimony whereof I hereunto affix my signature.

SILAS P. TAYLOR.